US007082484B2

(12) United States Patent
Cranford, Jr. et al.

(10) Patent No.: US 7,082,484 B2
(45) Date of Patent: Jul. 25, 2006

(54) ARCHITECTURE FOR ADVANCED SERIAL LINK BETWEEN TWO CARDS

(75) Inventors: Hayden Clavie Cranford, Jr., Apex, NC (US); Vernon Roberts Norman, Cary, NC (US); Martin Leo Schmatz, Gallen (CH)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 09/996,091

(22) Filed: Nov. 28, 2001

(65) Prior Publication Data

US 2002/0095541 A1 Jul. 18, 2002

Related U.S. Application Data

(60) Provisional application No. 60/262,358, filed on Jan. 16, 2001.

(51) Int. Cl.
*G06F 13/42* (2006.01)
*G06F 13/12* (2006.01)
*G06F 13/38* (2006.01)

(52) U.S. Cl. .................. 710/106; 710/69; 710/71; 710/305

(58) Field of Classification Search .................. 710/65, 710/71, 106, 305, 69, 51, 62, 105; 375/133, 375/135, 136; 341/126, 144, 155
See application file for complete search history.

(56) References Cited

U.S. PATENT DOCUMENTS

| 5,069,522 | A | * | 12/1991 | Block et al. .................. 385/39 |
| 5,115,450 | A | * | 5/1992 | Arcuri .......................... 375/219 |
| 5,131,013 | A | * | 7/1992 | Choi ............................ 375/372 |
| 5,140,688 | A | | 8/1992 | White et al. ................ 395/550 |
| 5,202,979 | A | * | 4/1993 | Hillis et al. .................... 714/6 |
| 5,757,862 | A | * | 5/1998 | Ishizu .......................... 375/324 |
| 5,761,516 | A | | 6/1998 | Rostoker et al. ............ 395/733 |

(Continued)

FOREIGN PATENT DOCUMENTS

EP    0 686 920 A2 * 12/1995

OTHER PUBLICATIONS

'modem' in "Microsoft Press Computer Dictionary" 3rd Edition, pp. 311-312. [1997].*

(Continued)

*Primary Examiner*—Khanh Dang
*Assistant Examiner*—Thomas J. Cleary
(74) *Attorney, Agent, or Firm*—Joscelyn G. Cockburn; William N. Hogg

(57) ABSTRACT

A global architecture for a serial link connection between two cards which must transmit data across wired media is provided. The architecture comprises a transmitter portion and a receiver portion. The transmitter portion includes a structure and circuitry to take digital bits from a first bit register, such as for example, an eight-bit register or a ten-bit register, and convert these bits into serial analog transmission to the receiver portion. The receiver portion includes a structure and circuitry to sample the analog transmission of the original digital bits and reconvert the analog serial signal of the digital bits corresponding to the original digital bits and store them in a second bit register comparable to the data stored in the original register from which they were selected.

20 Claims, 3 Drawing Sheets

U.S. PATENT DOCUMENTS

| | | | | |
|---|---|---|---|---|
| 5,878,265 | A | | 3/1999 | Hartmann .............. 395/800.11 |
| 5,936,678 | A | * | 8/1999 | Hirashima .................. 348/537 |
| 5,943,378 | A | * | 8/1999 | Keba et al. ................. 375/373 |
| 5,974,487 | A | | 10/1999 | Hartmann ................... 710/100 |
| 6,018,782 | A | | 1/2000 | Hartmann ................... 710/129 |
| 6,222,380 | B1 | * | 4/2001 | Gerowitz et al. ............. 326/38 |
| 6,463,266 | B1 | * | 10/2002 | Shohara ................... 455/196.1 |
| 6,731,697 | B1 | * | 5/2004 | Boccuzzi et al. ........... 375/326 |
| 2002/0094055 | A1 | * | 7/2002 | Cranford et al. ............ 375/376 |
| 2002/0136343 | A1 | * | 9/2002 | Cranford et al. ............ 375/376 |
| 2002/0146084 | A1 | * | 10/2002 | Cranford et al. ............ 375/360 |
| 2004/0066871 | A1 | * | 4/2004 | Cranford et al. ............ 375/371 |
| 2004/0218705 | A1 | * | 11/2004 | Cranford et al. ............ 375/355 |
| 2005/0111536 | A1 | * | 5/2005 | Cranford et al. ............ 375/226 |

OTHER PUBLICATIONS

'synchronous transmission' in "Newton's Telecom Dictionary" 8th Edition, Harry Newton. p. 995. [1994].*

Buchsbaum, Walter H. "D.9.0 Latch, Basic" and "D.9.1 Latch, Strobed" in Encyclopedia of Integrated Circuits: A Practical Handbook of Essential Reference Data (Englewood Cliffs, NJ, Prentice-Hall, Inc., 1981). pp. 194-197.*

"modem" in Microsoft Press Computer Dictionary (3rd Edition, 1997). pp. 311-312.*

Newton, Harry. "synchronous transmission" in Newton's Telecom Dictionary (8th Edition, 1994). p. 995.*

* cited by examiner

ARCHITECTURE FOR ADVANCED SERIAL LINK BETWEEN TWO CARDS

RELATED APPLICATIONS

This application claims the benefits of provisional patent application Ser. No. 60/262,358, filed Jan. 16, 2001, for "Global Architecture for Advanced Serial Link".

This application is related to the following copending applications, all of which are incorporated herein by reference: Ser. No. 09/996,113, filed Nov. 28, 2001, for "Unified Digital Architecture"; Ser. No. 09/996,053, filed Nov. 28, 2001, for "Analog Unidirectional Serial Link Architecture"; and Ser. No. 09/997,587, filed Nov. 28, 2001, for "Apparatus And Method For Oversampling With Evenly Spaced Samples".

FIELD OF THE INVENTION

This invention relates generally to the transfer of data in serial form from a register on one ASIC (application specific integrated circuit) chip on a card to a register on another ASIC chip on a card and, more particularly, to the serial transfer of such data wherein the data is converted from parallel digital form to serial analog form for transfer from one ASIC to the second ASIC and is then reconverted to parallel digital form in the second ASIC, after it has been transferred, in serial analog form.

BACKGROUND OF THE INVENTION

Serial data must be transmitted across wired media. The transmit and receive sections include chips wired to one another and card-to-card interconnects. The transmission media can be a combination of printed circuit boards, connectors, back plane wiring, fiber or cable. The interconnect can include its own power, data and clocking sources or may derive these functions from a host module. Such data has typically been transmitted through a parallel data bus, such as ISA, PCI, PCI-X and the like. One drawback of such parallel links is the moderate rate of data transmission due to improved microprocessor performance, resulting in data transfer bandwidths that typically outpace I/O transfer rates. Also, the ASIC I/O count is high. In addition, the system integration I/O count using a parallel data bus is high. Finally, the overall system cost associated with the use of the parallel data bus tends to be high.

Related art shows attempts to overcome these difficulties and drawbacks by utilizing serial communication systems involving a variety of schemes. For example, some have used a carrierless amplitude/phase (CAP) modulation scheme. Others have used linear compression/decompression and digital signal processing techniques for frequency modulation. Still others use a linear (analog) phase rotator to recover only the carrier of an incoming signal. Some transmit using a pass band which limits the bandwidth of the frequencies being passed, rather than a baseband channel wherein the signals are not shared and the frequencies are not restricted.

SUMMARY OF THE INVENTION

The present invention comprises a global architecture for a serial link connection between two cards which must transmit data across wired media. The architecture comprises a transmitter and a receiver. The transmitter includes circuitry and a structure to take digital bits from a bit register, such as for example, an eight-bit register or a ten-bit register, and convert these bits into serial analog transmission to the receiver. The receiver includes a structure and circuitry to sample edges of the data on analog transmission of the original digital bits and reconvert the analog serial signal of the digital bits to the original digital bits and store them in a register comparable to the data stored in the original register from which they were selected.

DESCRIPTION OF THE PREFERRED EMBODIMENT

Figure 1:
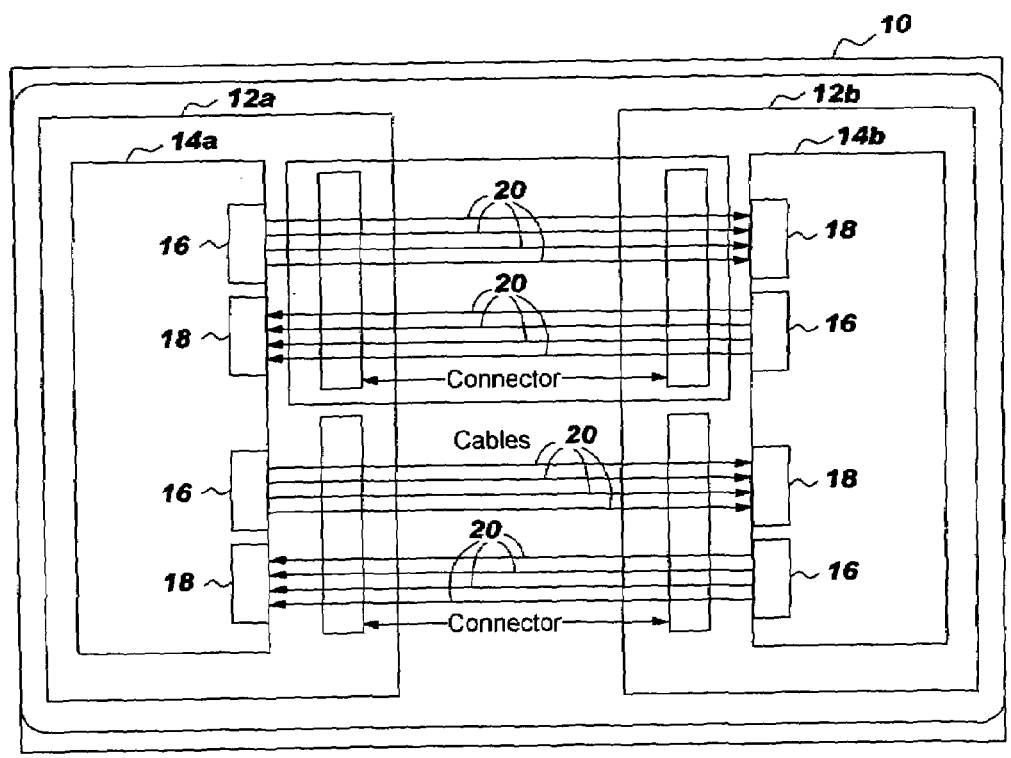
FIG. 1 is a high level diagram showing the wired interconnection between the transmitter portion and the receiver portion of the serial link.

Referring now to the drawings and, for the present, to FIG. 1, a high level diagram of interconnection of ASICs showing a transmitter on one side of the connection and a receiver on the other side of the connection for several different transmitter and receivers for passing information is shown. The present invention, as indicated above, can be implemented in any one of several different configurations, such as a combination of a printed circuit boards, connectors, back plane wiring, fiber or cable. As shown, the implementation will be on a back plane with hard wiring between the transmitting portion and the receiving portion.

As can be seen in FIG. 1, a back plane 10 is provided which has mounted thereon a pair of printed circuit (PC) cards 12a and 12b. Each circuit card 12a and 12b is provided with, respectively, ASIC chips 14a and 14b which are to be interconnected according to the present invention. Each ASIC 14a, 14b has at least one transmitter 16 and, as illustrated, has two such transmitters, although more can be provided. Also, each ASIC 14a, 14b is provided with at least one receiver 18; again, the illustrated embodiment shows two receivers 18, although, as indicated above with respect to the transmitter 16, more than two can be provided. Generally speaking, the transmitter 16 and receiver 18 are provided in pairs since data generally will have to flow in both directions and the connection described herein is unidirectional. Each transmitter 16 on ASIC 14a or 14b includes one-way hard wired serial buses 20 interconnecting the transmitter 16 on one ASIC 14a or 14b to a receiver 18 on the other ASIC 14a or 14b. Thus, two-way communication is provided by having paired transmitters and receivers on each ASIC 14a or 14b.

Figure 2:
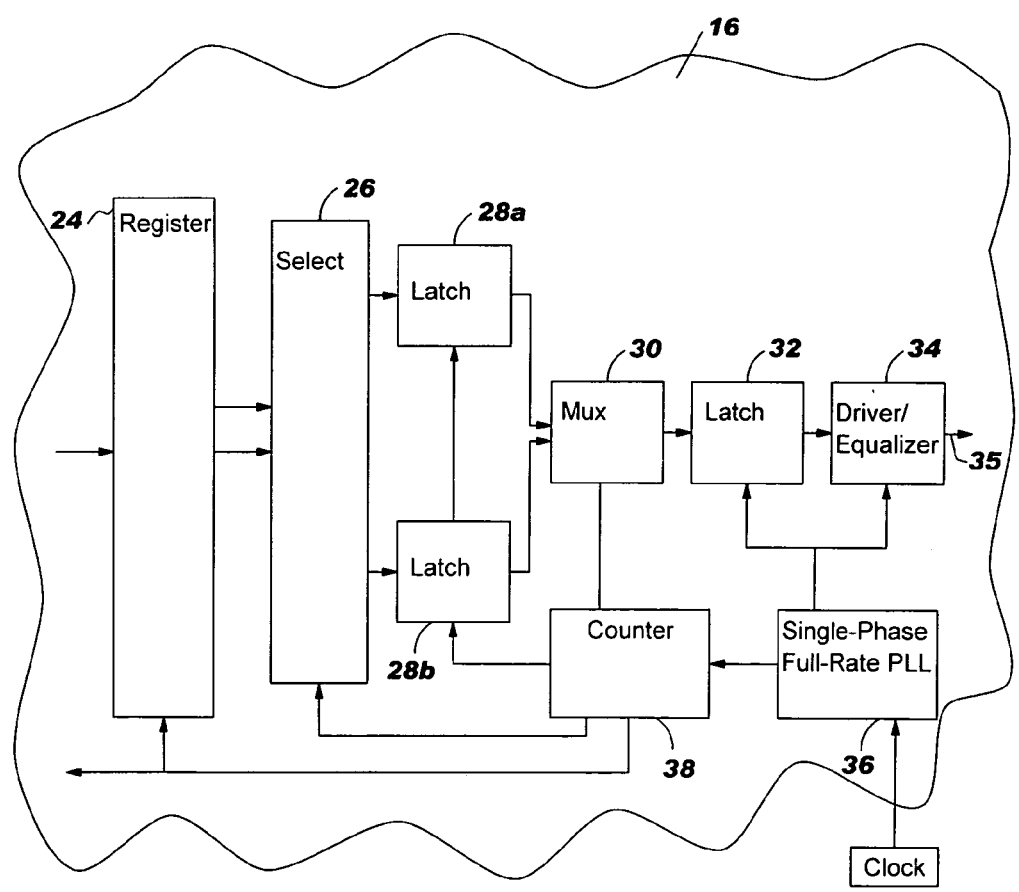
FIG. 2 is a block diagram showing the operation of the circuitry of the transmitter of the architecture.

Briefly, each transmitter 16 has stored therein parallel digital data in a register 24 (FIG. 2). The transmitter 16 converts this stored, parallel, digital data in the register 24 in one ASIC, eg. 14a, to serial analog form, transmits the data in serial analog form on one of the serial buses 20 to the receiver 18 associated therewith on the opposite ASIC, eg. 14b. The receiver 18 converts the analog asynchronous serial data to synchronous, parallel, digital data for storage 68 (FIG. 3) in a register in digital form.

Thus, the function of the serial link herein is to take parallel data in a register in an efficient manner, transmit it in an asynchronous serial analog form and reconvert it to synchronous, parallel, digital data.

Referring now to FIG. 2, a block diagram of the circuitry function of a transmitter 16 is shown. As can be seen, the transmitter 16 includes a bit register 24. Typically, this is either an eight-bit or a ten-bit register, although other size registers could be used. The description of this particular register 24 will be as a ten-bit register. A two-bit of ten bit selector 26 is provided which will select two bits at a time sequentially from the register 24. This is done under the synchronous control of counter 38. It is to be understood that other than two bits at a time can be read from the register 24. However, this number must be a number that is evenly divisible into the number of bits in the register 24. Thus, in the case of a ten-bit register, this could be one, two or five and, in the case of an eight-bit register, this could be one, two or four. Two bits are preferred.

Each of the two bits selected by the selector 26 from the register 24 is provided to a bit latch 28a or 28b. This selection and delivery is also under the synchronous control of counter 38. The bits are then delivered from the latches 28a and 28b to a multiplexor 30, also under the synchronous control of counter 38, and then to a one-bit latch 32. From the one-bit latch 32, the bits are delivered to a driver equalizer 34, which will convert the received digital bits from the latch 32 to a serial analog signal output 35 containing the converted digital bits.

A single phase, full rate, phase lock loop 36 is provided which will clock the action of the latch 32 and driver equalizer 34, and also will actuate the counter 38 which, in turn, has inputs to the multiplexor 30, the latches 28a and 28b, the select 26 and the ten-bit register 24. The phase lock loop 36 has as an input thereto a clock signal, which can be internal or external from clock 40, as shown. The counter 38 functions to provide synchronous operation of the extraction of the bits from the register 24 by the selector 26 for delivery to the latches 28a and 28b. Also, the counter operates to form a synchronous delivery of the bits from the latches 28a and 28b to the multiplexor 30 and therefrom to the latch 32. It is at the driver equalizer 34 that the digital bits synchronously received are converted to a serial analog signal 35. The functioning and more detailed description of the various parts of the transmitter 16, such as the bit register 24, selector 26, the latches 28a and 28b, the multiplexor 30, the latch 32, the single phase, full rate, phase lock loop 36 and the counter 38 are all described in more detail in application Ser. No. 09/996,113, filed Nov. 28, 2001, for "Unified Digital Architecture" and application Ser. No. 09/996,053, filed Nov. 28, 2001, for "Analog Unidirectional Serial Link Architecture", which applications are incorporated herein by reference. The analog output 35 is placed on the serial bus 20. It is transmitted in an asynchronous form to the receiver 18 attached to the other end of the serial bus 20. As indicated above, the receiver 18 receives the asynchronous analog signal and converts it to a synchronous digital parallel signal corresponding to the digital bits in register 24 for storage in the receiver 18.

Figure 3:
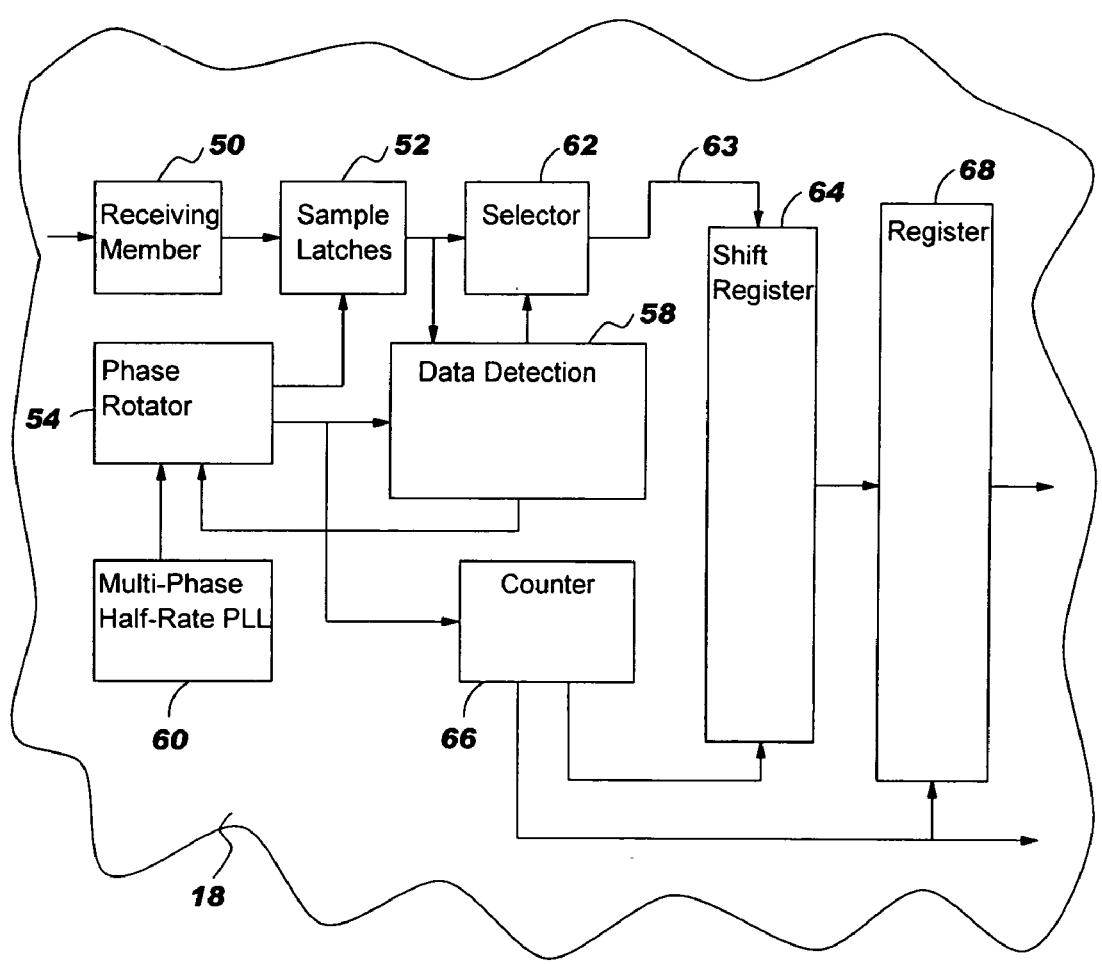
FIG. 3 is a block diagram showing the operation of the circuitry of the receiver of the architecture.

Referring now to FIG. 3, a block diagram showing the structure and circuitry function for converting the asynchronous analog serial signal 35 to a synchronous digital parallel digital bits for storage in the receiver 18 for storing bits is shown. The serial analog asynchronous signal 35 is received by a signal receiving member 50 which delivers the analog signal to sample latches 52. In the sample latches 52, the analog signal is converted to a digital signal by means of a phase rotator 54 which operates under the control of a data detection and edge detection circuit 58 and a multi-phase, half rate phase loop lock 60. This technique operates by sampling, and preferably multiple sampling, both edges of the data in the analog signal and converts the data in the analog signal to parallel data bits. Preferably, the multiple samples are used to determine the approximate center point of each resulting data bit. This is an oversampling circuit which will convert the asynchronous analog serial signal in selector 62 to a digital output 63 in two-bit increments delivered to a shift register 64. A counter 66, which is actuated by the phase rotator 54, operates on shift register 64 to output the two-bit digital signals as ten-bit synchronous signals to tea-bit register 68. The operation of this receiver 18 is described in detail in application Ser. No. 09/996,053, filed Nov. 28, 2001, for "Analog Unidirectional Serial Link Architecture", and application Ser. No. 09/997,587, filed Nov. 28, 2001, for "Apparatus and Method for Oversampling with Evenly Spaced Samples", which applications are incorporated herein by reference.

Thus, the ten-bit digital bits stored as parallel data in the ten-bit register 24 are converted by the transmitter 16 to an asynchronous analog serial signal 35 which is to be transported asynchronously on bus 20, which asynchronous analog signal 35 is then reconstituted by the receiver 18 to the original ten-bit parallel digital bit in register 68.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A method of transferring stored digital parallel data of multiple bits of data stored in a first data register from a transmitter to a receiver over a hard wired conductor comprising the steps of:

synchronously converting said stored digital data to a serial analog data signal in said transmitter;

transmitting said serial analog signal asynchronously over said hard wired conductor to said receiver; and restoring said asynchronous serial analog signal to synchronous digital parallel data in said receiver corresponding to the data stored in said first data register in said transmitter, including detecting both edges of the data in said asynchronous serial analog signal for conversion to parallel data bits and using a phase rotator operating under the control of a phase lock loop to convert said asynchronous signal to said synchronous digital parallel data in conjunction with said edge detection.

2. The invention as defined in claim 1 wherein the digital parallel data is read out of said first data register to at least one single bit latch.

3. The invention as defined in claim 2 wherein the data is read out from said first register in said transmitter two bits at a time, each data bit to first and second single data bit latches, and from each first and second single bit data latch to a third single bit data latch, clocking additional two data bits to be subsequently written to said first and second one bit latches and to said third single bit data latch until all bits of the data have been read from the first register.

4. The invention as defined in claim 3 wherein the bits from the third single bit latch are converted to a single analog serial signal of the data.

5. The invention as defined in claim 1 wherein the data in said first register is comprised of either eight or ten bits.

6. The invention as defined in claim 1 wherein a clocking signal is used to convert said analog serial signal to a digital signal.

7. The invention as defined in claim 3 wherein said analog signal is converted in said receiver to two one-bit signals and delivered to a shift register and then stored in a second data register.

8. The invention as defined in claim 7 wherein said bits in the shift register are delivered synchronously from said shift register to said second data register.

9. The invention as defined in claim 1 wherein said edges are derived from multiple samples.

10. The invention as defined in claim 9 wherein said multiple samples are used to determine the approximate center of said resulting data bit.

11. A structure for transferring stored digital parallel data of multiple bits of data stored in a first data register, comprising a transmitter and a receiver connected by a hard wired conductor;
   circuitry to synchronously convert said stored digital data to a serial analog data signal in said transmitter;
   circuitry to transmit said serial analog signal asynchronously over said hard wired conductor to said receiver; and
   circuitry to restore said asynchronous serial analog signal to synchronous digital parallel data in said receiver corresponding to the data stared in said first data register in said transmitter, including detecting both edges of the data in said asynchronous serial analog signal for conversion to parallel data bits, said circuitry to restore said asynchronous signal to said synchronous digital data, including a phase rotator operating under the control of a phase lock loop to act in conjunction with the circuitry to detect both edges.

12. The invention as defined in claim 11 including at least one single bit latch and circuitry to read the digital parallel data out of said first data register to said at least one single bit latch.

13. The invention as defined in claim 12 including first, second and third single data bit latches, and wherein the data is read out from said first register in said transmitter two bits at a time, each data bit to either said first or second single data bit latches, and then from each first and second single bit data latch to said third single bit data latch, clocking to clock additional two data bits to be subsequently written to said first and second one bit latches and to said third single bit data latch until all bits of the data have been read from the first register.

14. The invention as defined in claim 13 including circuitry to convert the bits from the third single bit latch into a single analog serial signal of the data.

15. The invention as defined in claim 11 wherein the data in said first register is comprised of either eight or ten bits.

16. The invention as defined in claim 11 including a clocking signal to convert said analog serial signal to a digital signal.

17. The invention as defined in claim 11 including a second data bit register and circuitry in said receiver to convert said analog signal to two one-bit signals delivered to a shift register, and store the converted bits in said second data register.

18. The invention as defined in claim 17 wherein said bits in the shift register are delivered synchronously from said shift register to said second data register.

19. The invention as defined in claim 11 including circuitry to derive said edges from multiple samples.

20. The invention as defined in claim 19 wherein said circuitry to derive said edges from said multiple samples determines the approximate center of said resulting data bit.

* * * * *

UNITED STATES PATENT AND TRADEMARK OFFICE
CERTIFICATE OF CORRECTION

PATENT NO. : 7,082,484 B2  Page 1 of 1
APPLICATION NO. : 09/996091
DATED : July 25, 2006
INVENTOR(S) : Canford, Jr. et al.

It is certified that error appears in the above-identified patent and that said Letters Patent is hereby corrected as shown below:

Please amend claim 11 as follows:

Column 5, line 24, change "stared" to --stored--.

Signed and Sealed this

Seventh Day of November, 2006

JON W. DUDAS
*Director of the United States Patent and Trademark Office*

UNITED STATES PATENT AND TRADEMARK OFFICE
CERTIFICATE OF CORRECTION

PATENT NO.        : 7,082,484 B2                                Page 1 of 1
APPLICATION NO.   : 09/996091
DATED             : July 25, 2006
INVENTOR(S)       : Canford, Jr. et al.

It is certified that error appears in the above-identified patent and that said Letters Patent is hereby corrected as shown below:

On the Title page: Item [56] insert the following references:

U.S. Patent Documents

Patent No. 5,757,807; Issued 5/26/1998; Applicant Tezuka et al.

Other Publications

December 12, 2002, Notification of Transmittal of The International Search Report PCT/GB 02/00128

Signed and Sealed this

Second Day of January, 2007

JON W. DUDAS
*Director of the United States Patent and Trademark Office*